United States Patent [19]

Blinne et al.

[11] Patent Number: 5,200,450
[45] Date of Patent: Apr. 6, 1993

[54] THERMOPLASTIC MOLDING COMPOSITIONS BASED ON POLYAMIDE

[75] Inventors: Gerd Blinne, Bobenheim; Walter Goetz, Ludwigshafen; James Hurley, Mannheim; Herbert Gutsche, Beindersheim; Klaus Muehlbach, Heppenheim, all of Fed. Rep. of Germany

[73] Assignee: BASF Aktiengesellschaft, Ludwigshafen, Fed. Rep. of Germany

[21] Appl. No.: 769,431

[22] Filed: Oct. 1, 1991

[30] Foreign Application Priority Data

Oct. 6, 1990 [DE] Fed. Rep. of Germany ....... 4031724

[51] Int. Cl.$^5$ .................... C08J 5/10; C08K 5/07; C08L 51/00; C08G 69/00
[52] U.S. Cl. .................... 524/356; 524/363; 524/538; 525/420; 528/288; 528/292; 528/312; 528/316; 528/493
[58] Field of Search .............. 524/356, 363, 538; 525/420; 528/288, 292, 312, 316, 493

[56] References Cited

U.S. PATENT DOCUMENTS

| | | | |
|---|---|---|---|
| 3,252,905 | 5/1966 | Schaeffer | 524/362 |
| 4,246,159 | 1/1981 | Chen | 524/773 |
| 4,791,027 | 12/1988 | Reimann et al. | 428/407 |
| 5,049,599 | 9/1991 | Steiert et al. | 524/606 |

FOREIGN PATENT DOCUMENTS

| | | |
|---|---|---|
| 234060 | 9/1987 | European Pat. Off. |
| 308671 | 3/1989 | European Pat. Off. |
| 1476997 | 6/1977 | United Kingdom |

*Primary Examiner*—Paul R. Michl
*Assistant Examiner*—Patrick Niland
*Attorney, Agent, or Firm*—Herbert B. Keil

[57] ABSTRACT

The thermoplastic molding compositions contain as essential components
A) from 96 to 99.9% by weight of at least one polyamide,
B) from 0.1 to 4% by weight of one or more dialkyl ketones of the general formula I $$R-\overset{\overset{\displaystyle O}{\|}}{C}-R' \qquad I$$

where R and R' are each alkyl of from 10 to 30 carbon atoms, and also, based on the sum total of A) and B),
C) from 0 to 40% by weight of an impact modifying rubber,
D) from 0 to 60% by weight of fibrous or particulate fillers or a mixture thereof, and
E) from 0 to 120% by weight of a modified polyphenylene ether.

8 Claims, No Drawings

THERMOPLASTIC MOLDING COMPOSITIONS BASED ON POLYAMIDE

The present invention relates to thermoplastic molding compositions containing as essential components A) from 96 to 99.9% by weight of at least one polyamide, B) from 0.1 to 4% by weight of one or more dialkyl ketones of the general formula I

where R and R' are each alkyl of from 10 to 30 carbon atoms, and also, based on the sum total of A) and B), C) from 0 to 40% by weight of an impact modifying rubber, D) from 0 to 60% by weight of fibrous or particulate fillers or a mixture thereof, and E) from 0 to 120% by weight of a modified polyphenylene ether.

The present invention also relates to processes for preparing these thermoplastic molding compositions, the use thereof for producing fibers, films and moldings, and to the shaped articles thus obtainable.

Polyamides such as poly-ε-caprolactam and polyhexamethyleneadipamide are well known engineering plastics and have found application in many areas. They are notable in general for hardness, stiffness and heat resistance, but they are also resistant to abrasion and wear and to many chemicals. Mixtures of polyamides with polyphenylene ethers generally have good performance characteristics, since, given adequate interphase adhesion, the blend will combine the properties of the two polymers, such as toughness with stiffness, chemical resistance and heat resistance.

When processing polyamides or PPE/PA blends, in particular by injection molding, it is generally customary to add lubricants to improve the feed and demolding characteristics.

For instance, DE-A 37 06 356 describes polyamide granules having an outer lubricant coating of zinc stearate, aluminum stearate, calcium stearate and also $C_2$-$C_{24}$-esters of aliphatic carboxylic acids of from 6 to 24 carbon atoms.

DE-A 23 49 835 discloses the addition of calcium stearate or zinc stearate to polyamide molding compositions.

JP-A-62 119267 describes a mixture of polyamide, hydroxyl-containing metal stearates and lithium stearate.

EP-A 234 060 discloses PPE/PA blends which contain esters of long-chain carboxylic acids and at least trihydric alcohols as lubricants.

Furthermore, EP-A 308 671 describes the addition of long-chain fatty acids, acid chlorides or anhydrides to PPE/PA blends.

However, the addition of these lubricants leads to a reduction in the molecular weight and an attendant loss of toughness when processing polyamides, in particular at elevated temperature. This effect is particularly pronounced with high melting polyamides such as copolyamides of ε-caprolactam, hexamethylenediamine and terephthalic acid and of tetramethylenediamine and adipic acid. But polyamides formed from hexamethylenediamine and adipic acid also show these disadvantages, especially on addition of aluminum stearate.

The use of stearic acid, stearyl stearate, pentaerythritol esters, diglycol esters of long-chain fatty acids, palmitic acid, behenic acid and derivatives thereof as lubricants is likewise known. These compounds likewise have the abovementioned disadvantages.

As lubricants which are not based on derivatives of long-chain fatty acids it is possible to mention for example polytetrafluoroethylene, molybdenum sulfide and graphite. Disadvantages are here in particular the dark self-color and economic and health aspects.

Molding compositions of polyphenylene ethers and polyamides not only suffer from the known incompatibility of the individual polymer matrices but also have the problem that higher processing temperatures need to be used and that the flowability of the mixtures is not sufficient. Especially in the case of large moldings having long and occasionally very narrow flow paths, the flowability of the mixtures is not sufficient.

The additives known from the abovementioned prior art have an adverse effect on the mechanical properties (in particular the toughness) of the moldings, since easier demolding is obtained only after the melt has stood for a relatively long time.

Moreover, the processing parameters are dependent on the preparation conditions and the compositions of the mixtures, so that reproducibility is poor and continuous adjustment of the processing conditions is necessary.

It is an object of the present invention to provide thermoplastic molding compositions based on polyamide which are free of the above-described disadvantages and which are notable for flowability and processing stability.

We have found that this object is achieved by the thermoplastic molding compositions defined at the beginning. Preferred compositions of this type are revealed in the subclaims.

The present invention also provides processes for preparing these thermoplastic molding compositions, the use thereof for producing fibers, films and moldings, and the shaped articles thus obtainable.

As component A) the thermoplastic molding compositions according to the present invention contain from 96 to 99.9% by weight, preferably from 99 to 99.7% by weight, of at least one polyamide.

It is possible to use not only thermoplastic partly crystalline but also amorphous polyamides. Preference is given to polyamides having a melting point of more than 250° C., in particular more than 275° C.

As component A) it is advantageous to use in particular partly aromatic copolyamides composed essentially of $A_1$) 20–90% by weight of units derived from terephthalic acid and hexamethylenediamine, $A_2$) 0–50% by weight of units derived from ε-caprolactam, and $A_3$) 0–80% by weight of units derived from adipic acid and hexamethylenediamine, $A_4$) 0–40% by weight of further polyamide-forming monomers, the proportion of component ($A_2$) or ($A_3$) or ($A_4$) or mixtures thereof being at least 10% by weight.

Component $A_1$) contains 20–90% by weight of units derived from terephthalic acid and hexamethylenediamine.

In addition to units derived from terephthalic acid and hexamethylenediamine, the copolyamides contain units derived from ε-caprolactam and/or units derived from adipic acid and hexamethylenediamine and/or units derived from further polyamide-forming monomers.

The proportion of units derived from ε-caprolactam is not more than 50% by weight, preferably from 20 to 50% by weight, in particular from 25 to 40% by weight, while the proportion of units derived from adipic acid and hexamethylenediamine is up to 80% by weight, preferably from 30 to 75% by weight, in particular from 35 to 60% by weight.

The copolyamides may contain not only units of ε-caprolactam but also units of adipic acid and hexamethylenediamine; in this case it is of advantage for the proportion of units which are free of aromatic groups to be not less than 10% by weight, preferably not less than 20% by weight. The ratio of units derived from ε-caprolactam and from adipic acid and hexamethylenediamine is therefore not subject to any special restriction.

Preference is given to copolyamides whose composition in the ternary diagram lies within the pentangle defined by the corner points $X_1$ to $X_5$, where the points $X_1$ to $X_5$ are defined as follows:

$X_1$
    40% by weight of units $A_1$)
    60% by weight of units $A_3$)
$X_2$
    60% by weight of units $A_1$)
    40% by weight of units $A_3$)
$X_3$
    80% by weight of units $A_1$)
    5% by weight of units $A_2$)
    15% by weight of units $A_3$)
$X_4$
    80% by weight of units $A_1$)
    20% by weight of units $A_2$)
$X_5$
    50% by weight of units $A_1$)
    50% by weight of units $A_2$)

In the drawing, the pentangle defined by these points is shown in a ternary diagram.

Of particular advantage for many applications are polyamides containing from 50 to 80, in particular from 60 to 75%, by weight of units derived from terephthalic acid and hexamethylenediamine (units $A_1$) and from 20 to 50, preferably from 25 to 40%, by weight of units derived from ε-caprolactam (units $A_2$).

In addition to the above-described units $A_1$) to $A_3$), the partly aromatic copolyamides may contain further polyamide-forming monomers $A_4$) of the type known from other polyamides in amounts of up to 40, preferably 10–30, in particular 20–30%, by weight.

Aromatic dicarboxylic acids $A_4$) have from 8 to 16 carbon atoms. Suitable aromatic dicarboxylic acids are for example isophthalic acid, substituted terephthalic and isophthalic acids such as 3-t-butylisophthalic acid, polycyclic dicarboxylic acids, e.g. 4,4'- and 3,3'-biphenyldicarboxylic acid, 4,4'- and 3,3'-diphenylmethanecarboxylic acid, 4,4'- and 3,3'-sulfodiphenyldicarboxylic acid 1,4- or 2,6-naphthalenedicarboxylic acid and phenoxyterephthalic acid, of which isophthalic acid is particularly preferred.

Further polyamide-forming monomers $A_4$) can be derived from dicarboxylic acids of from 4 to 16 carbon atoms and aliphatic or cycloaliphatic diamines of from 4 to 16 carbon atoms and also from aminocarboxylic acids or corresponding lactams of from 7 to 12 carbon atoms. As suitable monomers of these types there may be mentioned here suberic acid, azelaic acid and sebacic acid as representatives of aliphatic dicarboxylic acids, 1,4-butanediamine, 1,5-pentanediamine, piperazine, 4,4'-diaminodicyclohexylmethane, 2,2-(4,4'-diaminodicyclohexyl)propane and 3,3'-dimethyl-4,4'-diaminodicyclohexylmethane as representatives of diamines, and capryllactam, enantholactam, ω-aminoundecanoic acid and laurolactam as representatives of lactams or aminocarboxylic acids.

The following compositions of component (A) are particularly preferred:

$A_1$) from 65 to 85% by weight of units derived from terephthalic acid and hexamethylenediamine, and $A_4$) from 15 to 35% by weight of units derived from isophthalic acid and hexamethylenediamine, or $A_1$) from 50 to 70% by weight of units derived from terephthalic acid and hexamethylenediamine, $A_3$) from 10 to 20% by weight of units derived from adipic acid and hexamethylenediamine, and $A_4$) from 20 to 30% by weight of units derived from isophthalic acid and hexamethylenediamine.

If component ($A_4$) contains symmetrical dicarboxylic acids where the carboxyl groups are in the para position, it is advisable to combine them with ($A_1$) and ($A_2$) or ($A_1$) and ($A_3$) to form ternary copolyamides, since otherwise the copolyamide will have an excessively high melting point and will melt only with decomposition, which is not desirable.

Furthermore, those partly aromatic copolyamides have proved particularly advantageous whose triamine content is less than 0.5, preferably less than 0.3%, by weight.

Partly aromatic copolyamides prepared by most existing processes (cf. U.S. Pat. No. 4,603,166) have triamine contents above 0.5% by weight, which leads to deterioration in product quality and to problems with continuous production. A triamine which is in particular responsible for these problems is dihexamethylenetriamine, which is formed from the hexamethylenediamine used in the preparation.

Copolyamides having a low triamine content have lower melt viscosities than similarly composed products which have a higher triamine content, while the solution viscosity is the same. This improves not only the processing properties but also the product properties appreciably.

The melting points of the partly aromatic copolyamides lie within the range from 270° C. to 325° C., preferably from 280° to 310° C., which high melting points are also associated with a high glass transition temperature of in general more than 75° C., in particular more than 85° C. (in the dry state).

Binary copolyamides based on terephthalic acid, hexamethylenediamine and ε-caprolactam which contain about 70% by weight of units derived from terephthalic acid and hexamethylenediamine have melting points in the 300° C. range and (in the dry state) a glass transition temperature of more than 110° C.

Binary copolyamides based on terephthalic acid, adipic acid and hexamethylenediamine attain melting points of 300° C. or more at lower levels, about 55% by weight, of units derived from terephthalic acid and hexamethylenediamine (HMD), although the glass transition temperature is not quite as high as with binary copolyamides which in place of adipic acid or adipic acid/HMD contain ε-caprolactam.

Partly aromatic copolyamides for the purposes of the present invention are those which have a degree of crystallinity >10%, preferably >15%, and in particular >20%.

The degree of crystallinity is a measure of the proportion of crystalline fragments in the copolyamide, and is determined by X-ray diffraction.

The preferred partly aromatic copolyamides of low triamine content can be prepared by the processes described in EP-A-129 195 and EP-A 129 196.

In these processes, an aqueous solution of the monomers, i.e. here the monomers which form the units $A_1$) to $A_3$), is heated under superatmospheric pressure to 250°–300° C. with simultaneous evaporation of the water and formation of a prepolymer, then prepolymer and steam are continuously separated, the steam is rectified, and the entrained diamines are recycled. Finally, the prepolymer is passed into a polycondensation zone and polycondensed at 250°–300° C. under a superatmospheric pressure of from 1 to 10 bar. The essential feature of the process is that the aqueous salt solution is heated under a superatmospheric pressure of from 1 to 10 bar in the course of a residence time of less than 60 seconds, and on exit from the vaporizer zone the degree of conversion is advantageously at least 93% and the water content of the prepolymer is not more than 7% by weight.

These short residence times substantially prevent the formation of triamines.

The aqueous solutions used generally have a monomer content of from 30 to 70% by weight, in particular from 40 to 65% by weight.

The aqueous salt solution is advantageously passed continuously at from 50° to 100° C. into a vaporizer zone, where the aqueous salt solution is heated to 250°–330° C. under a superatmospheric pressure of from 1 to 10, preferably from 2 to 6, bar. It will be readily understood that the temperature employed is above the melting point of the particular polyamide to be prepared.

As mentioned earlier, it is essential that the residence time in the vaporizer zone is not more than 60 seconds, preferably from 10 to 55 seconds, in particular from 10 to 40 seconds.

The conversion on exit from the vaporizer zone is not less than 93%, preferably from 95 to 98%, and the water content is preferably within the range from 2 to 5, in particular from 1 to 3%, by weight.

It is also advantageous to pass the mixture of prepolymer and steam immediately downstream of the vaporizer zone, before the phases are separated, through a tubular mass transfer zone equipped with internal fitments. This is done under the temperature and pressure conditions employed in the vaporizer zone. The internal fitments, e.g. packing such as Raschig rings, metal rings or in particular wire netting, ensure a large surface area. This ensures intimate contact between the phases, i.e. prepolymer and steam, and ensures that the amount of diamine freed with steam is appreciably reduced. In general, the mass transfer zone is operated with a residence time of from 1 to 15 minutes. The mass transfer zone is advantageously constructed as a tube bundle.

The two-phase mixture of steam and prepolymer emerging from the vaporizer or mass transfer zone is separated. Separation generally takes place automatically, owing to the physical differences, in a vessel the bottom part of which is advantageously constructed as a polymerisation zone. The freed vapors consist essentially of steam and diamines freed on evaporation of the water. These vapors are passed into a column and rectified. Suitable columns are for example packed columns, bell tray columns or sieve plate columns of from 5 to 15 theoretical plates. The column is advantageously operated under the same pressure conditions as the vaporizer zone. The diamines contained in the vapors are separated off and returned into the vaporizer zone. It is also possible to pass the diamines into the downstream polymerization zone. The rectified steam obtained is withdrawn at the top of the column. The prepolymer obtained, which according to its degree of conversion consists essentially of low molecular weight polyamide with or without residual amounts of unconverted salts and in general has a relative viscosity of from 1.2 to 1.7, is passed into a polymerization zone. In the polymerization zone, the melt obtained is polycondensed at 250°–330° C., in particular 270°–310° C., under a superatmospheric pressure of from 1 to 10 bar, in particular from 2 to 6 bar. Advantageously, the vapors freed here are rectified in the column together with the abovementioned vapors, and preferably the polycondensation zone is operated with a residence time of from 5 to 30 minutes. The polyamide thus obtained, which in general has a relative viscosity of from 1.2 to 2.3, is continuously removed from the condensation zone.

In a preferred process, the polyamide thus obtained is passed as a liquid melt through a discharge zone with simultaneous removal of the residual water present in the melt. Suitable discharge zones are for example devolatilization extruders. The melt thus freed of water is then strand extruded and granulated. The granules obtained are advantageously condensed in solid phase by means of superheated steam at a temperature below the melting point, e.g. at from 170° to 240° C., until the desired viscosity is obtained. Advantageously, this is done using the steam obtained at the top of the column.

Following the solid phase postcondensation the relative viscosity, measured in a 1% strength solution in 96% strength $H_2SO_4$ at 23° C., is in general within the range from 2.2 to 5.0, preferably from 2.3 to 4.5.

In a further preferred process, the polyamide melt discharged from the polycondensation zone is passed into a further polycondensation zone and condensed therein with continuous formation of new surfaces at from 285° to 310° C., advantageously under reduced pressure, for example at from 1 to 500 mbar, until the desired viscosity is obtained. Suitable vessels are known as finishers.

A further process, which is similar to that described above, is described in EP-A 12g 196, incorporated herein by reference.

Further suitable polyamides can be prepared for example by condensation of equimolar amounts of a saturated dicarboxylic acid of from 4 to 12 carbon atoms with a diamine of from 4 to 14 carbon atoms or by condensation of ω-aminocarboxylic acids or polyaddition of lactams.

Examples of polyamides are polyhexamethyleneadipamide, polyhexamethyleneazelaamide, polyhexamethylenesebacamide, polyhexamethylenedodecanediamide, polytetramethyleneadipamide and the polyamides obtained by ring opening of lactams such as polycaprolactam and polylaurolactam.

In general, these partly crystalline polyamides are linear.

Particular preference is given to polytetramethyleneadipamide and polyhexamethyleneadipamide and also to copolyamides of terephthalic acid, hexamethylenediamine and ε-caprolactam which have an ε-caprolactam content of less than 50% by weight.

These polyamides generally have a relative viscosity of from 2.0 to 5, determined in a 1% strength by volume solution in 96% strength by weight sulfuric acid at 23° C., which corresponds to a weight average molecular weight of from about $10^4$ to $5 \times 10^4$.

Polyamides having a relative viscosity of from 2.4 to 4.5, in particular of from 2.5 to 3.5, are preferred.

As component A) it is also possible to use mixtures of different polyamides.

The thermoplastic molding compositions according to the present invention contain as component B) from 0.1 to 4% by weight, preferably from 0.3 to 1% by weight, of dialkyl ketones of the general formula I $$R-\underset{\underset{O}{\|}}{C}-R' \qquad I$$

where R and R' are each alkyl of from 10 to 30 carbon atoms, preferably from 16 to 22 carbon atoms, in particular of 18, 20 or 22 carbon atoms. These radicals R and R' can be identical or different, but preference is given to dialkyl ketones having identical radicals, in particular distearyl ketone and dibehenyl ketone and also dipalmitinoyl ketone and dioleoyl ketone. It is also possible to use mixtures of different dialkyl ketones.

Such dialkyl ketones and processes for preparing them are known per se. They can be prepared for example by dry distillation of calcium or magnesium salts of the corresponding carboxylic acids. For details reference should be made to the literature (A. G. Dobson and H. H. Hatt, Org. Synth. 33 (1953), 84, and also Curtis, Dobson and Hatt, J. Soc. Chem. Ind., 66 (1947), 402).

As component C) the thermoplastic molding compositions according to the present invention contain from 0 to 40, preferably from 10 to 25%, by weight, based on the sum total of components A) +B), of an elastomeric polymer.

In general, this will be a copolymer which is preferably composed of at least two of the following monomers as main components: ethylene, propylene, isobutene, isoprene, chloroprene, vinyl acetate, styrene, acrylonitrile and acrylic and methacrylic esters having from 1 to 18 carbon atoms in the alcohol component.

Rubbers of this kind are described for example in Houben-Weyl, Methoden der organischen Chemie, vol. 14/1 (Thieme-Verlag, Stuttgart, 1961), pages 392–406, and in the monograph by C. B. Bucknall, Toughened Plastics (Applied Science Publishers, London, 1977).

Preferred types of these elastomers are the ethylene-propylene monomer (EPM) and ethylene-propylene-diene monomer (EPDM) rubbers, which preferably have an ethylene unit to propylene unit ratio within the range from 40:60 to 90:10.

The Mooney viscosities (MLI+4/100° C.) of such uncrosslinked EPM or EPDM rubbers (gel contents in general below 1% by weight) are preferably within the range from 25 to 100, in particular from 35 to 90 (measured with the large rotor after 4 minutes at 100° C. in accordance with German Standard Specification DIN 53 523).

EPM rubbers in general have virtually no double bonds left, while EPDM rubbers can have from 1 to 20 double bonds/100 carbon atoms.

As diene monomers for EPDM rubbers there may be mentioned for example conjugated dienes such as isoprene, nonconjugated dienes of from 5 to 25 carbon atoms such as 1,4-pentadiene, 1,4-hexadiene, 1,5-hexadiene, 2,5-dimethyl-1,5-hexadiene and 1,4-octadiene, cyclic dienes such as cyclopentadiene, cyclohexadienes, cyclooctadienes and dicyclopentadiene and also alkenylnorbornenes such as 5-ethylidene-2-norbornene, 5-butylidene-2-norbornene, 2-methallyl-5-norbornene, 2-isopropenyl-5-norbornene and tricyclodienes such as 3-methyltricyclo[5.2.1.0.2.6]-3,8-decadiene or mixtures thereof. Preference is given to 1,5-hexadiene, 5-ethylidenenorbornene and dicyclopentadiene. The diene content of the EPDM rubbers is preferably from 0.5 to 50, in particular from 1 to 8%, by weight, based on the total weight of the rubber.

EPM and EPDM rubbers can preferably also be grafted with reactive carboxylic acids or derivatives thereof. These include for example acrylic acid, methacrylic acid and derivatives thereof and also maleic anhydride.

A further group of preferred rubbers are copolymers of ethylene with acrylic acid and/or methacrylic acid and/or the esters of these acids. In addition, the rubbers may contain dicarboxylic acids such as maleic acid and fumaric acid or derivatives thereof, such as esters and anhydrides, and/or epoxy-containing monomers. These dicarboxylic acid derivatives and epoxy-containing monomers are preferably incorporated in the rubber by adding dicarboxylic acid- or epoxy-containing monomers of the general formula II or III or IV or V to the monomer mixture $$R_1C(COOR_2)=C(COOR_3)R_4 \qquad II$$

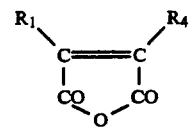

III

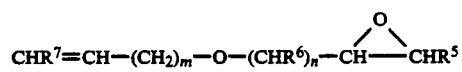

IV

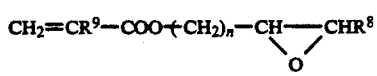

V where $R^1$ to $R^9$ are each hydrogen or alkyl of from 1 to 6 carbon atoms, m is an integer from 0 to 20, n is an integer from 0 to 10 and p is an integer from 0 to 5.

Preferably, each of $R^1$-$R^7$ is hydrogen, m is 0 or 1, and n is 1. The corresponding compounds are maleic acid, fumaric acid, maleic anhydride, allyl glycidyl ether and vinyl glycidyl ether.

Preferred compounds of the formulae II, III and V are maleic acid, maleic anhydride and epoxy-containing esters of acrylic acid and/or methacrylic acid, of which glycidyl acrylate, glycidyl methacrylate and the esters with tertiary alcohols, such as t-butyl acrylate, are particularly preferred. It is true that the latter have no free carboxyl groups, but their behavior is similar to that of the free acids and therefore they are referred to as monomers having latent carboxyl groups.

The ethylene content of the copolymers is in general within the range from 50 to 98% by weight, and the proportion of methacrylic esters is within the range from 2 to 50% by weight. Advantageously, the copolymers consist of from 50 to 98% by weight of ethylene, from 0.1 to 20% by weight of epoxy-containing monomers and/or methacrylic acid and/or acid anhydride group-containing monomers and also methacrylic esters as remainder.

Particular preference is given to copolymers of from 50 to 98.9, in particular from 60 to 95%, by weight of ethylene, from 0.1 to 40, in particular from 0.3 to 20%, by weight of glycidyl acrylate and/or glycidyl methacrylate, acrylic acid and/or maleic anhydride, and from 1 to 45, in particular from 10 to 35%, by weight of n-butyl acrylate and/or 2-ethylhexyl acrylate.

Further preferred esters of acrylic and/or methacrylic acid are the methyl, ethyl, propyl and i- or t-butyl esters.

In addition it is also possible to use vinyl esters and vinyl ethers as comonomers.

The above-described ethylene copolymers can be prepared in a conventional manner, preferably by random copolymerization under high pressure at elevated temperature. Appropriate methods are common knowledge.

The melt index of the ethylene copolymers is in general within the range from 1 to 80 g/10 min (measured at 190° C. under a load of 2.16 kg).

Preferred elastomers C) are emulsion polymers whose preparation is described for example in Houben-Weyl, Methoden der organischen Chemie, volume XII. I (1961), and also in Blackley's monograph, Emulsion Polymerization. The emulsifiers and catalysts used are known per se.

In principle, it is possible to use elastomers which have a homogeneous structure or else elastomers which have a shell structure. The shell-like structure is determined by the order of addition of the individual monomers; the order of addition also has a bearing on the morphology of the polymers.

Merely representative examples of monomers for preparing the rubber part of the elastomers are acrylates, e.g. n-butyl acrylate or 2-ethylhexyl acrylate, the corresponding methacrylates and isoprene and also mixtures thereof. These monomers can be copolymerized with further monomers such as styrene, acrylonitrile, vinyl ethers and further acrylates or methacrylates such as methyl methacrylate, methyl acrylate, ethyl acrylate and propyl acrylate.

The soft or rubber phase (having a glass transition temperature of below 0° C.) of the elastomers can represent the core, the outer sheath or an intermediate shell (in the case of elastomers having more than two shells); in the case of multishell elastomers it is also possible for more than one shell to be made of a rubber phase.

If in addition to the rubber phase one or more hard components (having glass transition temperatures of more than 20° C.) are involved in the formation of the elastomer, they are in general prepared by polymerization of styrene, acrylonitrile, α-methacrylonitrile, α-methylstyrene, p-methylstyrene, acrylic esters and methacrylic esters such as methyl acrylate, ethyl acrylate and methyl methacrylate as principal monomers. Again, here too, minor amounts of further comonomers can be used.

In some cases it will be advantageous to use emulsion polymers which have reactive groups at the surface. Such groups are for example epoxy, carboxyl, latent carboxyl, amino or amide groups and also functional groups which can be introduced by using monomers of the general formula

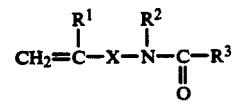

where the substituents can have the following meanings:

$R^1$ is hydrogen or $C_1-C_4$-alkyl, $R^2$ is hydrogen, $C_1-C_8$-alkyl or aryl, in particular phenyl, $R^3$ is hydrogen, $C_1-C_{10}$-alkyl, $C_6-C_{12}$-aryl or $-OR^4$, $R^4$ is a $C_1-C_8$-alkyl or $C_6-C_{12}$-aryl, which may each be substituted by O- or N-containing groups, X is a chemical bond, $C_1-C_{10}$-alkylene, $C_6-C_{12}$-arylene or

Y is $O-Z-$ or $NH-Z-$ and

Z is $C_1-C_{10}$-alkylene or $C_6-C_{12}$-arylene.

It is also possible to use the graft monomers described in EP-A-208 187 for introducing reactive groups at the surface.

Further examples are acrylamide, methacrylamide and substituted esters of acrylic acid or methacrylic acid such as (N-t-butylamino)ethyl methacrylate, (N,N-dimethylamino)ethyl acrylate, (N,N-dimethylamino)-methyl acrylate and (N,N-diethylamino)ethyl acrylate.

Furthermore, the particles of the rubber phase may also be crosslinked. Crosslinking monomers are for example divinylbenzene, diallyl phthalate and dihydrodicyclopentadienyl acrylate and also the compounds described in EP-A 50 265.

Furthermore, it is also possible to use graft-linking monomers, i.e. monomers having two or more polymerizable double bonds which react at different rates during the polymerization. Preference is given to those compounds in which at least one reactive group polymerizes at substantially the same rate as the other monomers, while the other reactive group or groups polymerizes or polymerize for example at a distinctly slower rate. The different polymerization rates introduce a certain proportion of unsaturated double bonds into the rubber. If such a rubber is subsequently grafted with a further phase, the double bonds present in the rubber react at least partly with the graft monomers to form chemical bonds, so that the grafted-on phase ends up being linked at least to some extent to the grafting base via chemical bonds.

Examples of such graft-linking monomers are allyl-containing monomers, in particular allyl esters of ethylenically unsaturated carboxylic acids such as allyl acrylate, allyl methacrylate, diallyl maleate, diallyl fumarate, diallyl itaconate or the corresponding mono-allyl compounds of these dicarboxylic acids. There are many other suitable graft-linking monomers; for details reference should be made for example to U.S. Pat. No. 4,148,846.

In general, the proportion of these crosslinked monomers in component C) is up to 5% by weight, preferably not more than 3% by weight, based no C).

In what follows, some preferred emulsion polymers are listed. The first group to be mentioned here are graft polymers having a core and at least one outer shell which have the following structure:

| Type | Monomers for the core | Monomers for the sheath |
|------|----------------------|------------------------|
| A | isoprene, n-butyl acrylate, ethylhexyl acrylate or mixtures thereof | styrene, acrylonitrile, methyl methacrylate |
| B | as for A but with the use of crosslinkers | as for A |
| C | as for A or B | n-butyl acrylate, ethyl acrylate, methyl acrylate, isoprene, ethylhexyl acrylate |
| D | as for A or B | as for A or C but with the use of monomers having reactive groups as described herein |
| E | styrene, acrylonitrile, methyl methacrylate or mixtures thereof | first sheath made of monomers as described under A and B for the core second sheath as described under A or C for the sheath |

Instead of graft polymers having a multishell structure it is also possible to use homogeneous, i.e. single-shell, elastomers formed of isoprene and n-butyl acrylate or copolymers thereof. These products too can be prepared using crosslinking monomers or monomers having reactive groups.

Examples of preferred emulsion polymers are n-butyl acrylate/(meth)acrylic acid copolymers, n-butyl acrylate/glycidyl acrylate or n-butyl acrylate/glycidyl methacrylate copolymers, graft polymers having an inner core of n-butyl acrylate and an outer sheath of the aforementioned copolymers and copolymers of ethylene with comonomers which provide reactive groups.

The above-described elastomers C) can also be prepared by other customary methods, for example by suspension polymerization.

It is of course also possible to use mixtures of the aforementioned types of rubber.

Preference is given to using rubbers which contain no butadiene.

Examples of rubbers which increase the toughness of polyphenylene ethers are: polyoctenylenes, graft rubbers having a crosslinked, elastomeric core derived for example from butadiene, isoprene or alkyl acrylates and a graft sheath of polystyrene, also copolymers of ethylene and acrylates or methacrylates and the ethylene-propylene (EP) and ethylene-propylene-diene monomer (EPDM) rubbers, also the styrene-grafted EP or EPDM rubbers.

Block copolymers having up to 6, preferably up to 4, identical or different blocks, which may be linked not only in linear fashion but also in starlike fashion (giving radial block copolymers), have proved particularly suitable.

Preference is given to block rubbers where at least one block, preferably an end block, is formed of aromatic vinyl monomers such as styrene, α-methylstyrene, vinyltoluene, vinylnaphthalene or isopropylnaphthalene. Polystyrene is particularly preferred as aromatic vinyl block.

Customarily, these preferred block copolymers also contain an elastomeric block which is characterized by a glass transition temperature of less than 0° C., preferably less than −30° C. This block is derived for example from conjugated dienes such as butadiene, isoprene, 1,3-pentadiene or 2,3-dimethylbutadiene. To obtain products of good sustained-use heat resistance, it has proved particularly advantageous for at least 50%, preferably at least 80%, in particular at least 90%, of the double bonds to be hydrogenated.

The transitions between the individual blocks can be not only sharp but also tapered.

Preferably, the rubbers which increase the toughness of polyphenylene ethers are linear block copolymers of the general structure A-B, A-B-A' or A-B-A'-B', where A and A' each represent an aromatic vinyl block, preferably polystyrene, and B and B' each represent an elastomeric block, preferably formed of butadiene and/or isoprene, which may both be hydrogenated.

Mixtures of block copolymers of different structures, for example mixtures of two- and three-block copolymers or of hydrogenated and nonhydrogenated block copolymers, can likewise be used.

Such impact modifying polymers are known per se and described in the literature. Examples of references are U.S. Pat. Nos. 4,085,163, 4,041,103, 3,149,182, 3,231,635 and 3,462,162.

Appropriate products are also commercially available, for example a polyoctylene under the name Vestenamer ® (Hüls AG), and also a multiplicity of suitable block copolymers having at least one aromatic vinyl block and one elastomeric block. Examples are the Cariflex ®-TR range (Shell), the Kraton ®-G range (Shell), the Finaprene ® range (Fina) and the Europrene ®-SOL-TR range (Enichem).

The molding compositions of the present invention may contain from 0 to 60% by weight, preferably from 15 to 35% by weight, based on the sum total of components A) and B), of a fibrous or particulate additive or mixtures of such fillers. If the molding compositions of the present invention contain component E, in particular the level of glass fibers can be up to 85% by weight.

Examples of fibrous fillers are glass fibers, carbon fibers, aramid fibers, potassium titanate fibers and fibrous silicates such as wollastonite.

If glass fibers are used, they may have been dressed with a size and a coupling agent for better compatibility with the polyamide.

In general, the glass fibers used have a diameter within the range from 6 to 20 μm. They can be incorporated not only in the form of short fibers but also in the form of continuous strands or rovings. In the finished injection molding, the average length of the glass fibers is preferably within the range from 0.08 to 5 mm.

Suitable particulate fillers are glass balls, particulate wollastonite, quartz powder, boron nitride, kaolin, calcium carbonate, mica, magnesium carbonate (chalk) and titanium dioxide, of which wollastonite, titanium dioxide and kaolin are in general preferred.

In addition to the essential components, the molding compositions of the present invention may contain customary additives and processing aids. The proportion thereof is in general up to 20, preferably up to 10%, by weight, based on the total weight of components A) to D).

Customary additives are for example stabilizers, antioxidants, flame retardants, agents against decomposition by heat and ultraviolet light, colorants, dyes, pigments and plasticizers.

Antioxidants and heat stabilizers which can be added to the thermoplastic compositions of the present invention are for example halides of metals of Group I of the Periodic Table, e.g. sodium, potassium and lithium halides, with or without copper(I) halides, e.g. chlorides, bromides or iodides. It is also possible to use sterically hindered phenols, hydroquinones, substituted representatives of this group and mixtures thereof, preferably in concentrations up to 1% by weight, based on the weight of the mixture.

Examples of UV stabilizers are sterically hindered amines, various substituted resorcinols, salicylates, benzotriazoles and benzophenones, which in general are used in amounts of up to 2% by weight.

The molding compositions of the present invention may contain as component E) from 0 to 120, preferably from 40 to 100, and in particular from 50 to 90%, by weight, based on the sum total of components A) and B), of a modified polyphenylene ether.

The polyphenylene ethers generally have a weight average molecular weight within the range from 10,000 to 80,000, preferably from 20,000 to 60,000.

This corresponds to a reduced specific viscosity $\eta_{red}$ of from 0.2 to 0.9 dl/g, preferably from 0.35 to 0.8, in particular from 0.45 to 0.6, measured in a 1% strength by weight solution in chloroform at 25° C. in accordance with German Standard Specification DIN 53 726.

Unmodified polyphenylene ethers are known per se and are preferably prepared by oxidative coupling of phenols which are disubstituted in the o-position.

Examples of substituents are halogen atoms such as chlorine or bromine and alkyl radicals of from 1 to 4 carbon atoms which preferably have no $\alpha$-disposed tertiary hydrogen atom, e.g. methyl, ethyl, propyl or butyl. The alkyl radicals may in turn be substituted by halogen atoms such as chlorine or bromine or by a hydroxyl group. Further examples of possible substituents are alkoxy radicals, preferably of up to 4 carbon atoms, or unsubstituted or halogen- and/or alkyl-substituted phenyl radicals. It is similarly possible to use copolymers of various phenols such as copolymers of 2,6-dimethylphenol and 2,3,6-trimethylphenol. It is of course also possible to use mixtures of different polyphenylene ethers.

The polyphenylene ethers used as component E) may contain process-induced flaws as described for example by White et al., Macromolecules 23, (1990), 1318–1329.

Preference is given to using those polyphenylene ethers which are compatible with, i.e. completely or substantially soluble in, aromatic vinyl polymers (cf. A. Noshay, Block Copolmers, pages 8 to 10, Academic Press, 1977, and O. Olabisi, Polymer-Polymer Miscibility, 1979, pages 117 to 189).

Examples of polyphenylene ethers are poly(2,6-dilauryl-1,4-phenylene ether) poly(2,6-diphenyl-1,4-phenylene ether), poly(2,6-dimethoxy-1,4-phenylene ether), poly(2,6-diethoxy-1,4-polyphenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenylene-1,4-phenylene ether), poly(2,6-dibenzyl-1,4-phenylene ether), poly(2-ethoxy-1,4-phenylene ether), poly(2-chloro-1,4-phenylene ether), poly(2,5-dibromo-1,4-phenylene ether). Preference is given to using polyphenylene ethers where the substituents are alkyl radicals of from 1 to 4 carbon atoms, such as poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether) and poly(2-ethyl-6-propyl-1,4-phenylene ether).

It is also possible to use graft copolymers of polyphenylene ethers and aromatic vinyl polymers such as styrene, $\alpha$-methylstyrene, vinyltoluene and chlorostyrene.

Functionalized or modified polyphenylene ethers are known per se, for example from WO-A 86/02086, WO-A 87/00540, EP-A-222 246, EP-A-223 116 and EP-A-254 048.

Customarily, an unmodified polyphenylene ether is modified by incorporation of at least one carbonyl, carboxylic acid, acid anhydride, acid amide, acid imide, carboxylic ester, carboxylate, amino, hydroxyl, epoxy, oxazoline, urethane, urea, lactam or halobenzyl group, so as to ensure adequate compatibility with the polyamide (component A).

The modification is in general effected by reacting an unmodified polyphenylene ether $e_1$) with a modifier which contains at least one of the above-mentioned groups and at least one C—C double or C—C triple bond in solution (WO-A 86/2086), in aqueous dispersion, in a gas phase process (EP-A-25 200) or in the melt in the presence or absence of suitable aromatic vinyl polymers or impact modifiers, and in the presence or absence of free radical initiators.

Suitable modifiers ($e_3$) are for example maleic acid, methylmaleic acid, itaconic acid, tetrahydrophthalic acid, their anhydrides and imides, fumaric acid, the mono- and diesters of these acids, for example with $C_1$- and $C_2$- to $C_8$-alkanols ($e_{31}$), the mono- or diamides of these acids such as N-phenylmaleimide (monomer $e_{32}$), maleohydrazide. It is also possible to use for example N-vinylpyrrolidone and (meth)acryloylcaprolactam ($e_{33}$). Another group of modifiers comprises for example the acid chloride of trimellitic anhydride, 4-acetoxycarbonylphthalic anhydride, chloroethanoylsuccinaldehyde, chloroformylsuccinaldehyde, citric acid and hydroxysuccinic acid.

Preference is given to using as component E) of the molding compositions of the present invention a modified polyphenylene ether which is obtainable by reacting $e_1$) from 9.94 to 99.94% by weight of an unmodified polyphenylene ether,
$e_2$) from 0 to 88% by weight of an aromatic vinyl polymer,
$e_3$) from 0.05 to 10% by weight of at least one compound from the group consisting of
  $e_{31}$) an $\alpha,\beta$-unsaturated dicarbonyl compound,
  $e_{32}$) a monomer with a polymerizable double bond which contains an amide group, and
  $e_{33}$) a monomer with a polymerizable double bond which contains a lactam group,
$e_4$) from 0 to 80% by weight of further graft-active monomers and
$e_5$) from 0.01 to 0.09% by weight of a free radical initiator, the weight percentages being based on the sum total of $e_1$) to $e_4$), in the course of from 0.5 to 15 minutes at 240°–375° C. in suitable mixing and kneading apparatus such as twin-screw extruders.

The aromatic vinyl polymer $e_2$) should preferably be compatible with the polyphenylene ether used.

The molecular weight of these polymers, which are known per se, is in general within the range from 1500 to 2,000,000, preferably within the range from 70,000 to 1,000,000.

Examples of preferred aromatic vinyl polymers which are compatible with polyphenylene ethers are discernible in the abovementioned monograph of Olabisi, pages 224 to 230 and 245. Merely representative examples are aromatic vinyl polymers of styrene, chlorostyrene, α-methylstyrene and p-methylstyrene; in minor amounts (preferably not more than 20, in particular not more than 8%, by weight) it is also possible for comonomers such as (meth)acrylonitrile or (meth)acrylic esters to be involved. Particularly preferred aromatic vinyl polymers are polystyrene and high impact polystyrene. It will be readily understood that it is also possible to use mixtures of these polymers. Preparation is preferably by the process described in EP-A-302 485.

In the preparation of the modified polyphenylene ether it is also possible, if desired, to use further comonomers $e_4$) which under the synthesis conditions react with or graft onto the components $e_1$) and, if present, $e_2$). Examples are acrylic acid, methacrylic acid, acrylates, methacrylates and aromatic vinyl monomers such as styrene, α-methylstyrene and vinyltoluene, to name but a few.

The proportion of component $e_4$) is from 0 to 80, preferably from 0 to 45, in particular not more than 20%, by weight based on the sum total of components $e_1$) to $e_5$). Particular preference is given to molding compositions which contain no component $e_4$).

Examples of free radical initiators $e_5$) are: di(2,4-dichlorobenzoyl) peroxide, tert-butyl peroxide, di(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1-di-tert-butylperoxy-3,3,5-trimethylcyclohexane, tert-butyl peroxyisopropylcarbonate, tert-butyl peroxy-3,3,5trimethylhexanoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide, 1,3-di(tert-butylperoxyisopropyl)benzene and di-tert-butyl peroxide. It is also possible to mention here organic hydroperoxides such as diisopropylbenzene monohydroperoxide, cumene hydroperoxide, tert-butyl hydroperoxide, p-menthyl hydroperoxide and pinan hydroperoxide and also highly branched alkanes of the general structure

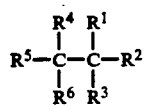

where each of $R^1$ to $R^6$ is alkyl of from 1 to 8 carbon atoms, alkoxy of from 1 to 8 carbon atoms, aryl such as phenyl, naphthyl or 5- or 6-membered heterocycles containing a $\pi$-electron system and nitrogen, oxygen or sulfur as hetero atoms. The substituents $R^1$ to $R^6$ may each in turn contain functional groups as substituents, such as carboxyl, carboxyl derivative, hydroxyl, amino, thiol or epoxy groups. Examples are 2,3-dimethyl-2,3-diphenylbutane, 3,4-dimethyl-3,4-diphenylhexane and 2,2,3,3-tetraphenylbutane.

The method whereby the thermoplastic molding compositions of the present invention are prepared is not crucial, but some methods have proved particularly suitable.

For instance, the component A) and any C) and/or D) and/or E) can be compounded, preferably on an extruder, to prepare granules. These granules can then be admixed with component B) in powder, melt or solution form, preferably at a temperature of the granules which is greater than the melting point of component B). For the particularly preferred cases of using distearyl ketone and dibehenyl ketone as component B), granule temperatures of from 100° to 140° C. have proved particularly suitable.

In a further preferred process for preparing the thermoplastic molding compositions according to the present invention, component B) is added to the melt of component A) and any C) and/or D) and/or E) by compounding. Suitable apparatuses for this are extruders, in particular twin-screw extruders. Other compounding means such as single-screw extruders and kneaders can of course also be used. The process temperatures are customarily about 10°–50° C. above the melting point of the polyamide used as component A). Preferably, the products are then extruded and granulated.

Component B) can also be added to the polycondensation of component A), which is preferably carried out in the melt. Here a subsequent solid phase condensation has proved particularly suitable, after which the products, as described earlier, are preferably extruded and granulated with or without component C) and/or D) and/or E).

It is also possible for component B) to be added to the polycondensation vessel of a batchwise polyamide condensation.

In a particularly suitable method for preparing the mixtures of polyamides and polyphenylene ethers, component B) is applied at room temperature to granules of component E) in solution or in powder form, and this mixture is then compounded with component A) and any D) and/or C).

The thermoplastic molding compositions of the present invention are notable for an altogether balanced property spectrum, in particular for good flowability and high processing stability. They are suitable for producing fibers, films and moldings.

EXAMPLES

Examples 1 to 3

A polyamide which contains 30% by weight of units derived from ε-caprolactam and 70% by weight of units derived from terephthalic acid and hexamethylenediamine (PA 6/6T) and has a viscosity number of 142 ml/g (measured on a 0.5% strength by weight solution in concentrated sulfuric acid at 25° C.) was compounded on a twin-screw extruder (ZSK 30 from Werner & Pfleiderer) with various dialkyl ketones (250 rpm, 320° C., loading at 25 kg/h). The products were strand extruded and granulated.

Comparative Examples C1 to C4

The procedure of Examples 1 to 3 was repeated, except that instead of dialkyl ketones either no lubricant was added (C1) or stearates were added (C2 to C4).

Example 4

A partly aromatic copolyamide (PA 6/6T as in Examples 1 to 3) was processed with an impact modifier of ethylene/n-butyl acrylate/acrylic acid in a weight ratio of 59.5/35/5.5 (MFI=9.8 g/10 min at 190° C. under a load of 2.16 kg) and chopped glass fibers having a diameter of 10 μm and a fiber length of 4.5 mm and an aminosilane size (Gevetex ® 5135 from Gevetex) and also distearyl ketone as described in Examples 1 to 3.

Comparative Examples C5 and C6

Example 4 was repeated, except that distearyl ketone was replaced by calcium stearate (C5) or no lubricant was added at all (C6).

Example 5

A polyamide consisting of units derived from hexamethylenediamine and adipic acid and having a viscosity number of 145 ml/g (measured on a 0.5% strength by weight solution in concentrated sulfuric acid at 25° C.) (PA 66, Ultramid ® A3 from BASF) was compounded with distearyl ketone, extruded and granulated as described in Examples 1 to 3.

Comparative Examples C7 and C8

Example 5 was repeated, except that the distearyl ketone was replaced by aluminum tristearate (C7) or no lubricant was added at all (C8).

Example 6

A polyamide consisting of units derived from tetramethylenediamine and adipic acid and having a viscosity number of 185 ml/g (PA 46) was compounded with distearyl ketone, extruded and granulated as described in Examples 1 to 3.

Comparative Examples C9 and C10

Example 6 was repeated, except that the distearyl ketone was replaced by calcium stearate (C9) or no lubricant was added at all (C10).

The products were subjected to determinations of the viscosity numbers VN (measured on 0.5% strength by weight solutions in concentrated sulfuric acid at 25° C.), the melt flow indices in accordance with German Standard Specification DIN 53 735 (at 325° C. in the case of PA 6/6T and at 275° C. in the case of PA 66, under a weight of 2.16 kg after 4 min following a heating-up time of 20 min), the filling pressure $P_{fill}$ (i.e. the minimum pressure for filling a test box; cf. Ultramid ® brochure from BASF page 46, illustration 38; at 330° C. in the case of PA 6/6T and at 280° C. in the case of PA 66), and the damaging energy $W_{50}$ in accordance with German Standard Specification DIN 53 443.

The compositions and properties are summarized in the table.

The distearyl ketone used was Loxiol ® VPG 2036 and the dibehenyl ketone Loxiol ® VPG 2037 from Henkel, Düsseldorf.

TABLE 1

| Example | A) [% by wt.] | B) [% by wt.] | C) Rubber [% by wt. based on A) + B)] | D) Glass fibers [% by wt. based on A) + B)] | VN [ml/g] | MFI 4 min [g/10 min] | MFI 20 min [g/10 min] | $P_{fill}$ [bar] | $W_{50}$ [J/m] |
|---|---|---|---|---|---|---|---|---|---|
| 1 | 99.5 PA6/6T | 0.5 distearyl ketone | | | 140 | 48 | 60 | 440 | 92 |
| 2 | 99.0 PA6/6T | 1.0 distearyl ketone | | | 143 | 55 | 60 | 400 | 110 |
| 3 | 99.5 PA6/6T | 0.5 dibehenyl ketone | | | 138 | 50 | 54 | 440 | 92 |
| C1 | 100.0 PA6/6T | — | | | 143 | 33 | 33 | 590 | 100 |
| C2 | 99.5 PA6/6T | 0.5 calcium stearate | | | 108 | 64 | 127 | 375 | 7 |
| C3 | 99.5 PA6/6T | 0.5 stearyl stearate | | | 119 | 55 | 99 | 400 | 13 |
| C4 | 99.3 PA6/6T | 0.7 aluminum tristearate | | | 99 | 75 | 103 | 360 | 5 |
| 4 | 99.5 PA6/6T | 0.5 distearyl ketone | 16.6 | 50 | 145 | 45 | 45 | 510 | 14 |
| C5 | 99.5 PA6/6T | 0.5 calcium stearate | 16.6 | 50 | 119 | 50 | 98 | 490 | <1 |
| C6 | 100.0 PA6/6T | — | 16.6 | 50 | 143 | 34 | 30 | 890 | 12 |
| 5 | 99.3 PA66 | 0.7 distearyl ketone | | | 141 | 180 | 171 | 320 | >140 |
| C7 | 99.3 PA66 | 0.7 aluminum tristearate | | | 126 | 185 | 212 | 300 | 95 |
| C8 | 100.0 PA66 | — | | | 143 | 127 | 123 | 490 | >140 |
| 6 | 99.3 PA46 | 0.7 distearyl ketone | | 50 | 149 | 72 | 202 | 500 | 10 |
| C9 | 99.3 PA46 | 0.7 calcium stearate | | 50 | 119 | 115 | >500 | 395 | <1 |
| C10 | 100.0 PA46 | — | | 50 | 142 | 49 | 139 | 800 | 7 |

Polyphenylene Ether/polyamide Mixtures

A modified polyphenylene ether (component E) was prepared from:

- $e_1$) 90% by weight of poly(2,6-dimethyl-1,4-phenylene ether) having a reduced viscosity $\eta_{red}=0.58$ dl/g (measured in a 1% strength by weight solution of CHCl$_3$ at 25° C.),
- $e_2$) 9% by weight of polystyrene (MFI (200° C./5 kg)=22 g/10') and
- $e_{31}$) 0.92% by weight of fumaric acid,
- $e_5$) 0.08% by weight of dicumyl peroxide which were mixed in a twin-screw extruder at 280° C. The melt was devolatilized, strand extruded, passed through a water bath and granulated.

Example 7

A polyamide as specified in Example 5 was compounded with the modified polyphenylene ether and a styrene-butadiene-styrene three-block copolymer as impact modifier (styrene content: 31% by weight, $\overline{M}_w$ (weight average): 72,000 (determined by GPC (gel permeation chromatography) in THF at 25° C. (polystyrene standard as calibration substance), Cariflex ® TR 1102 from Shell AG) and also distearyl ketone on a twin-screw extruder. The cylinder temperatures were 280°, 300° and 320° C.

The melt was strand extruded, hardened and granulated. The granules were dried under reduced pressure at 80° C. and injection molded at 280° C. into standard test specimens.

Comparative Examples C11 to C13

Example 7 was repeated, except that the distearyl ketone was replaced by pentaerythritol tetrastearate (C11 as per EP-A 234 060) or stearic acid (C12 as per EP-A 308 671) or no lubricant was added (C13).

The following mechanical tests were carried out:

| | |
|---|---|
| Notched impact strength $a_k$ [kJ/m$^2$] | DIN 53 435 |
| Impact strength $a_n$ kJ/m$^2$] (n.f. = no fracture) | DIN 53 435 |
| Penetration energy (PEN) [Nm] | DIN 53 443 |
| MVI (275° C./10 kg) [cm$^3$/10 min) | DIN 53 735 |
| Modulus of elasticity ($E_z$) [N/mm] | DIN 53 457 |

The molding compositions and the results of the measurements are shown in Table 2.

Example 11

PA 66, PPE and impact modifier as per Example 7 were compounded with dibehenyl ketone as lubricant and calcined kaolin as filler at 300° C., extruded and granulated.

Example 12

PA 66, PPE and distearyl ketone as per Example 7 and impact modifier as per Example 9 and also red phosphorus as flame retardant (median particle size $d_{50}$=45 μm) were compounded at 300° C., extruded and granulated.

The processing into test specimens and the measurements were carried out as described in Example 7.

In Example 12, additionally a burning test was carried out in accordance with UL-94 on 1, 6 and 0.8 mm thick rods, which each achieved the classification VE-0.

The molding compositions and the results of the measurements are shown in Table 3.

TABLE 2

| Example | Composition A) [% by wt.] | B) [% by wt.] | C) Rubber [% by wt. based on A) + B)] | E) PPE | Compounding temperature | MVI [cm$^3$/10 min] | $a_k$ [kJ/m$^2$] | PEN [Nm] |
|---|---|---|---|---|---|---|---|---|
| 7 | 99.3 PA66 | 0.7 distearyl ketone | 22.6 | 100 | 280 | 22 | 33 | 51 |
| | | | | | 300 | 21 | 37 | 53 |
| | | | | | 320 | 22 | 33 | 64 |
| C11 | 99.3 PA66 | 0.7 pentaerythritol tetrastearate | 22.6 | 100 | 280 | 23 | 27 | 25 |
| | | | | | 300 | 23 | 30 | 48 |
| | | | | | 320 | 24 | 31 | 55 |
| C12 | 99.3 PA66 | 0.7 stearic acid | 22.6 | 100 | 280 | 21 | 33 | 48 |
| | | | | | 300 | 23 | 29 | 47 |
| | | | | | 320 | 25 | 27 | 43 |
| C13 | 100 PA66 | — | 22.6 | 100 | 280 | 16 | 32 | 52 |
| | | | | | 300 | 16 | 37 | 55 |
| | | | | | 320 | 16 | 33 | 62 |

As the examples show, the addition of component B) according to the invention leads to an increase in the flowability without an adverse effect on the toughness. This is true over a wide temperature range.

Example 8

Poly-ε-caprolactam (PA 6, VN: 190 ml/g, Ultramid® B 35 from BASF AG) was compounded at 300° C. cylinder temperature with modified PPE and impact modifier and also lubricant as per Example 7, extruded and granulated.

Example 9

PA 6 and PPE as specified in Example 8 were compounded at 300° C. cylinder temperature with a hydrogenated styrene-butadiene-styrene three-block copolymer as impact modifier (polystyrene content 30% by weight; Kraton® G 1650 from Shell AG) and dibehenyl ketone as lubricant, extruded and granulated.

Example 10

PA 66, PPE and distearyl ketone as per Example 7 were compounded with glass fibers (fiber diameter about 13 μm) at 300° C., extruded and granulated.

Example 13

44% by weight of PA66, 43.8% by weight of modified PPE and 12% by weight of a hydrogenated two-block copolymer (styrene-butadiene) (polystyrene content: 37% by weight; Kraton® G1701 from Shell AG) and 0.2% by weight of a phenolic stabilizer (Irganox® 1010 from Ciba Geigy AG) were compounded at 300° C.

The hot granules at 130°-140° C. were coated with 0.4 part by weight, based on 100 parts by weight of the abovementioned mixture, of distearyl ketone, so that 0.9% by weight of distearyl ketone, based on 100% by weight of the sum total of A) and B), was present in the mixture. The granules were processed into test specimens at 280° C.

The notched impact strength $a_k$ was 25 kJ/m$^2$, the penetration energy PEN was 68 Nm, the impact

TABLE 3

| Example | Composition A) [% by wt.] | B) [% by wt.] | C) Rubber [in each case % by weight] | D) Additives [based on A) + B)] | E) PPE | MVI [cm$^3$/10 min] | $a_k$ [kJ/m$^2$] | PEN [Nm] | $a_n$ [kJ/m$^2$] | $E_z$ [N/mm] |
|---|---|---|---|---|---|---|---|---|---|---|
| 8 | 98.9 PA6 | 1.1 distearyl ketone | 22.5 | — | 100 | 29 | 42 | 67 | n.f. | 2350 |
| 9 | 99.3 PA6 | 0.7 dibehenyl ketone | 22.5 | — | 100 | 22 | 35 | 55 | n.f. | 2300 |
| 10 | 98.6 PA66 | 1.4 distearyl ketone | — | 85 | 100 | 12 | 11 | — | 48 | 9000 |
| 11 | 99 PA66 | 1 dibehenyl ketone | 19 | 50 | 72 | 19 | 12 | 32 | n.f. | 4300 |
| 12 | 98.8 PA66 | 1.2 distearyl ketone | 22.5 | 7 | 100 | 23 | 21 | 45 | n.f. | 2450 | strength test $a_n$ did not produce any fracture and the modulus of elasticity was 2310 N/mm.

We claim:

1. A thermoplastic molding composition consisting essentially of
    A) from 96 to 99.9% by weight of at least one polyamide with a melting point of more than 250° C.,
    B) from 0.1 to 4% by weight of one or more dialkyl ketones of the general formula I

where R and R' are each alkyl of from 10 to 30 carbon atoms,
and also, based on the sum total of A) and B),
    C) from 0 to 40% by weight of an impact modifying rubber,
    D) from 0 to 60% by weight of fibrous or particulate fillers or a mixture thereof, and
    E) from 0 to 120% by weight of a modified polyphenylene ether.

2. A thermoplastic molding composition as claimed in claim 1, wherein component A) is a partly aromatic copolyamide composed essentially of
    $A_1$) 20–90% by weight of units derived from terephthalic acid and hexamethylenediamine,
    $A_2$) 0–50% by weight of units derived from ε-caprolactam, and
    $A_3$) 0–80% by weight of units derived from adipic acid and hexamethylenediamine,
    $A_4$) 0–40% by weight of further polyamide-forming monomers,
the proportion of component ($A_2$) or ($A_3$) or ($A_4$) or mixtures thereof being at least 10% by weight.

3. A thermoplastic molding composition as claimed in claim 1, wherein component A) is a polyamide derived from tetramethylenediamine and adipic acid.

4. A thermoplastic molding composition as claimed in claim 1, wherein component B) is used in an amount of from 0.3 to 1% by weight.

5. A thermoplastic molding composition as claimed in claim 1, wherein component B) is distearyl ketone or dibehenyl ketone.

6. A process for preparing a thermoplastic molding composition as claimed in claim 1, which comprises applying component B) to granules of component A) which may contain component C) or D) or E) or mixtures thereof and whose temperature is greater than the melting point of component B).

7. A process for preparing a thermoplastic molding composition as claimed in claim 1, which comprises adding component B) to the melt of component A) and any C) or D) or E) or mixtures thereof.

8. A shaped article obtainable from a thermoplastic molding composition as claimed in claim 1 as essential component.

* * * * *